United States Patent
Hettle et al.

(10) Patent No.: US 7,694,557 B2
(45) Date of Patent: Apr. 13, 2010

(54) TIRE PRESSURE MONITORING SENSOR AND MOUNTING METHOD

(75) Inventors: Michael Hettle, Onsted, MI (US); Jean-Christophe Deniau, Fenton, MI (US)

(73) Assignee: Continental Automotive Systems US, Inc., Auburn Hills ( * ) Notice: Subject to any disclaimer, the term of this patent is extended or adjusted under 35 U.S.C. 154(b) by 0 days.

(21) Appl. No.: 12/018,900

(22) Filed: Jan. 24, 2008

(65) Prior Publication Data

US 2008/0173082 A1 Jul. 24, 2008

Related U.S. Application Data

(60) Provisional application No. 60/897,137, filed on Jan. 24, 2007, provisional application No. 60/897,136, filed on Jan. 24, 2007.

(51) Int. Cl.
*B60C 23/02* (2006.01)
(52) U.S. Cl. .................................... 73/146.8
(58) Field of Classification Search ............. 73/146.8
See application file for complete search history.

(56) References Cited

U.S. PATENT DOCUMENTS

| | | | |
|---|---|---|---|
| 3,908,105 A * | 9/1975 | Schuler | 200/61.25 |
| 4,411,302 A | 10/1983 | Kuypers | |
| 5,844,131 A * | 12/1998 | Gabelmann et al. | 73/146.8 |
| 6,055,855 A * | 5/2000 | Straub | 73/146.8 |
| 6,549,125 B2 * | 4/2003 | Nigon et al. | 340/447 |
| 6,805,000 B1 * | 10/2004 | Sheikh-Bahaie | 73/146.8 |
| 2003/0217595 A1 * | 11/2003 | Banzhof et al. | 73/146.8 |
| 2004/0163456 A1 * | 8/2004 | Saheki et al. | 73/146.8 |
| 2005/0087007 A1 * | 4/2005 | Uleski | 73/146 |
| 2006/0075812 A1 | 4/2006 | Luce | |
| 2007/0062268 A1 * | 3/2007 | Blossfeld et al. | 73/146.8 |
| 2007/0113637 A1 * | 5/2007 | Blossfeld | 73/146.8 |

FOREIGN PATENT DOCUMENTS

| | | |
|---|---|---|
| EP | 1661736 | 5/2006 |
| WO | 2007056293 | 5/2007 |

OTHER PUBLICATIONS

International Search Report dated Jun. 9, 2008.
International Search Report and Written Opinion mailed on Aug. 27, 2008.

* cited by examiner

*Primary Examiner*—Andre J Allen

(57) ABSTRACT

A tire pressure monitoring sensor includes resilient spring members to support and resist movement during rotation of the wheel.

15 Claims, 6 Drawing Sheets

US 7,694,557 B2

TIRE PRESSURE MONITORING SENSOR AND MOUNTING METHOD

CROSS REFERENCE TO RELATED APPLICATIONS

The application claims priority to U.S. Provisional Application Nos. 60/897,137 and 60/897,136 which were both filed on Jan. 24, 2007.

BACKGROUND OF THE INVENTION

This invention generally relates to a tire pressure monitoring sensor and method of installing and retaining a tire pressure monitoring sensor. More particularly, this invention relates to a tire pressure monitoring including features for improved installation, retention and mounting to a wheel.

A tire pressure sensor is typically mounted to a valve stem extending through the tire wheel rim. Commonly a rubber coated snap-in valve stem is pulled through an opening in the wheel rim and the resiliency of the rubber holds the valve and sensor in place. In some configurations the sensor is attached to the valve stem with a threaded member. During operation and high speed rotation of the wheel, the additional weight and mass of the sensor can cause the sensor to lift or move outwardly from the rim. The movement of the sensor outward is transferred to the valve stem extending through the wheel rim. The stress and force generated causes movement of the valve stem that in turn can result in leakage of air or loss of retention to the wheel.

Accordingly, it is desirable to design and develop a tire pressure sensor and mounting method that reduces the likelihood of leakage.

SUMMARY OF THE INVENTION

An example tire pressure monitoring sensor includes resilient spring members to better support and resist movement during operation. A spring clip provides a biasing force against an outer surface of the wheel rim. The rubber housing is mounted to the opening in the wheel rim and remains in place due to the biasing force exerted by the spring clip.

Another example tire pressure monitoring assembly includes a tire pressure sensor housing held to the rubber housing by a retaining member. The retaining member engages a spring insert disposed within the rubber housing. The spring insert biases the rubber housing outwardly to overlap the outer surface of the wheel rim and thereby secure the tire pressure monitoring assembly.

Yet another example spring insert is inserted within the bore of rubber housing and expanded radially upon engagement with a mandrel or the valve body. The spring insert includes a leading edge that engages the mandrel or valve stem. Engagement of the valve stem with the spring insert causes a portion of the spring insert to be driven radially outward. The radial outward movement of the spring insert causes a corresponding radial expansion of the rubber housing that generates a bias in a direction radially outward against the interior walls of the opening to provide a mechanical bias that strengthens the position of the tire pressure monitoring valve within the wheel rim.

Accordingly, the example tire pressure monitoring assemblies provide increased support for the valve stems to substantially prevent undesired movement during operation.

These and other features of the present invention can be best understood from the following specification and drawings, the following of which is a brief description.

DETAILED DESCRIPTION OF THE PREFERRED EMBODIMENT

Figure 1:
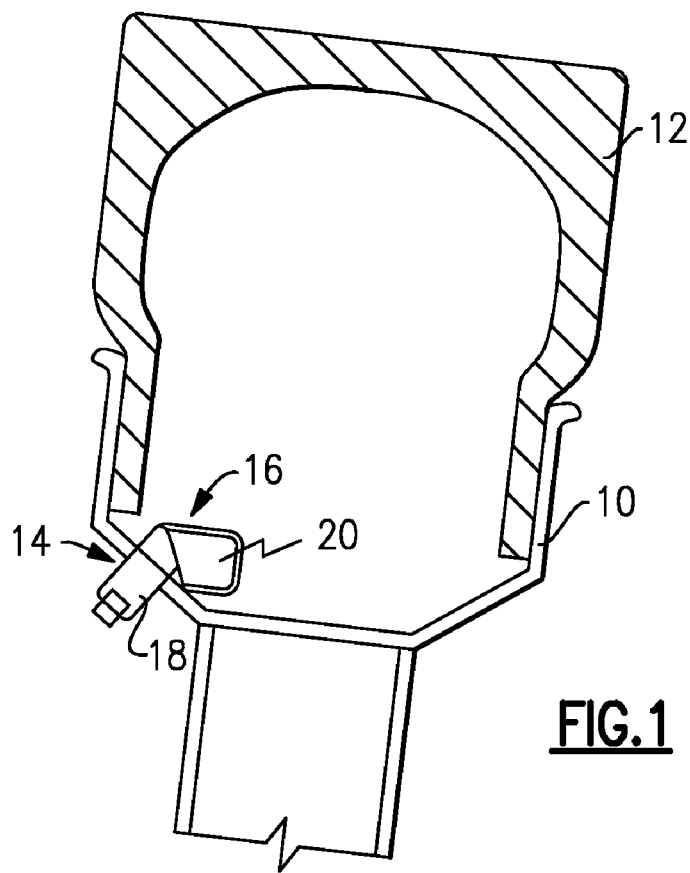
FIG. 1 is schematic view of a wheel rim and tire including an example tire pressure monitoring assembly.

Referring to FIG. 1, a tire 12 is mounted to a wheel rim 10 and includes a tire pressure monitoring assembly 16. The tire pressure monitoring assembly 16 includes a valve stem 18 that extends through an opening 14 in the wheel rim 10 and a tire pressure sensor 20 that is attached to the valve stem 18. The sensor 20 is supported by the valve stem 18 that is in turn received and secured to the wheel rim 10 within the opening 14. The sensor 20 includes devices for monitoring and communicating conditions within the tire 12, such as pressure and temperature.

Figure 2:
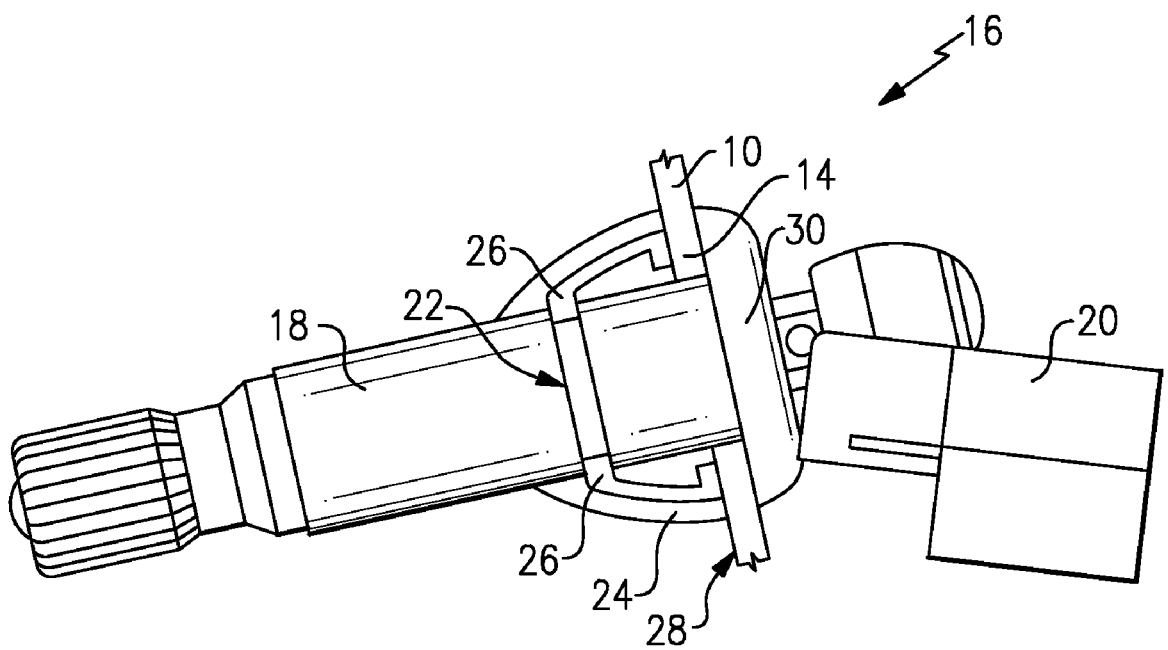
FIG. 2 is a side view of an example valve assembly.

Referring to FIG. 2, the example tire pressure sensor assembly 16 includes a spring clip 26 that provides a biasing force against an outer surface 28 of the wheel rim 10. The valve stem 18 is disposed at least partially within a rubber housing 24. The rubber housing 24 is mounted to the opening 14 in the wheel rim 10 and remains in place due to the biasing force exerted by the spring clip 26. The rubber housing 24 also extends through the opening 14 and provides a substantially tight fit within the opening 14 by expanding radially outward of the opening 14.

The valve stem 18 includes a groove 26 within which is mounted the spring clip 24. The groove 26 provides a fixed securement of the spring clip 24 to the valve stem 18, and thereby the tire pressure monitoring assembly 16. The spring clip 24 is deformable radially inward to provide for the insertion of the tire pressure monitoring assembly 16 and specifically, the valve stem 16 through the opening 14. Once through the opening 14, the spring clip 24 expands radially outward to prevent movement back through the opening 14.

The example spring clip 24 is encapsulated within the rubber housing 24 and exerts a biasing force that pulls against a rear flange 30. The biasing force of the spring clip 24 against the rear flange 30 works in concert to maintain a desired position of the tire pressure monitoring assembly 16 within the wheel rim 10.

Figure 3:
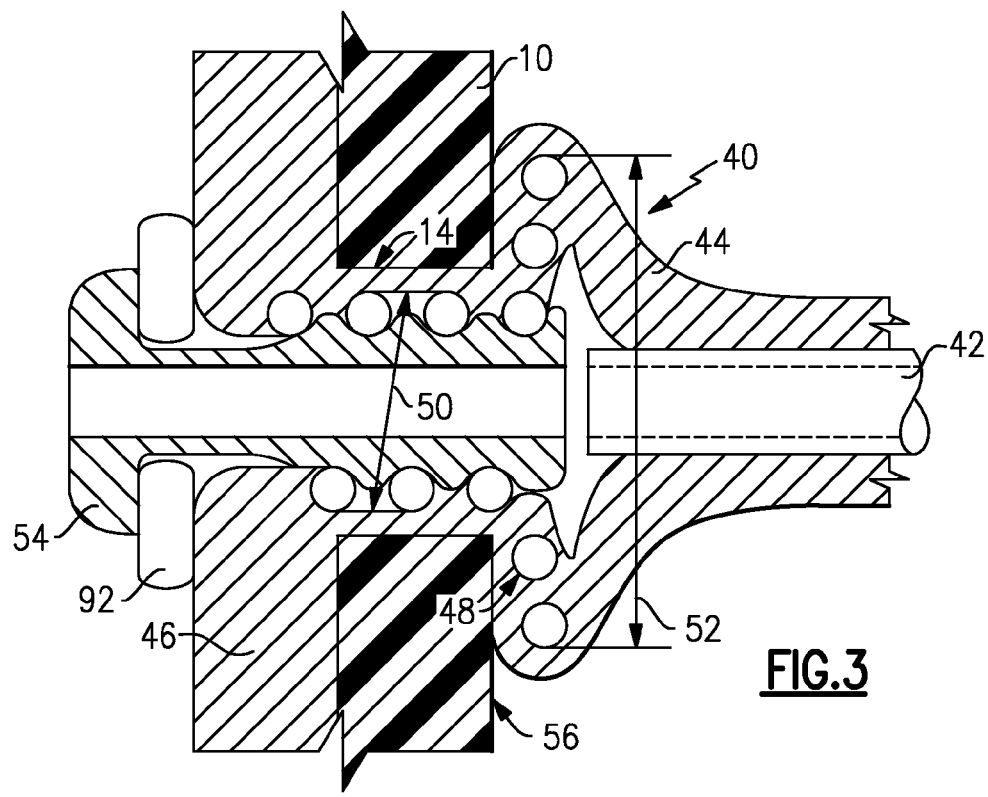
FIG. 3 is a cross-sectional view of a valve stem assembly mounted to a wheel rim.
Figure 4:
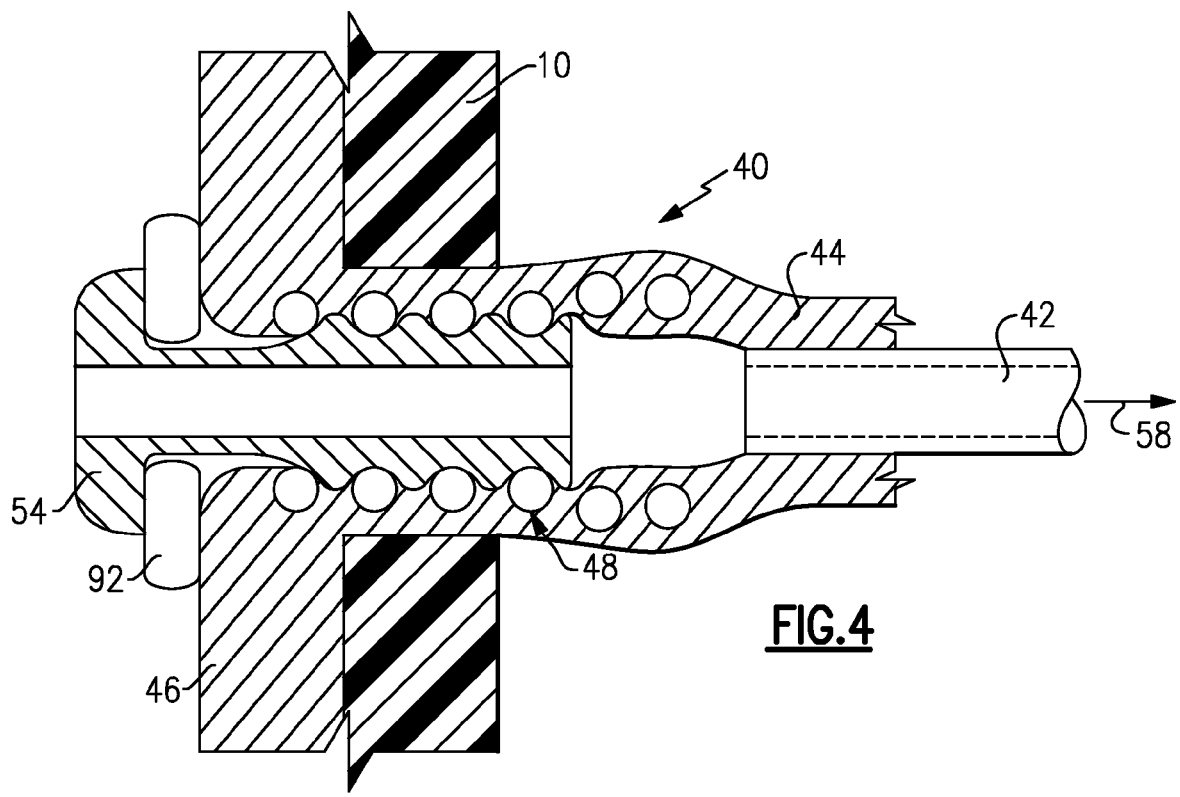
FIG. 4 is a cross-sectional view of the valve stem of FIG. 3 during assembly to the wheel rim.

Referring to FIGS. 3 and 4 another tire pressure monitoring assembly 40 includes a tire pressure sensor housing 92 (only partially shown) mounted to the wheel rim 10. The housing 92 is held to a rubber housing 44 by a retaining member 54. The retaining member 54 engages a coil spring insert 48 disposed within the rubber housing 44.

The coil spring insert 48 includes a first diameter 50 and a second diameter 52. The second diameter 52 is larger than the first diameter 50 and the opening 14 in the wheel rim 10. The second diameter of the coil spring insert 48 biases the rubber housing 44 outwardly to overlap the outer surface of the wheel rim 10.

During assembly of the tire pressure monitoring assembly 40, a pulling force in the direction indicated by arrow 58 pulls the rubber housing 44 through the opening 14. The pulling force in the direction 58 stretches the rubber housing 44 and the coil spring insert 48 to cause the outer diameter to neck down and become radially smaller. The larger second diameter 52 of the coil spring insert 48 also becomes smaller to provide for insertion of the rubber housing 44 through the opening 14. The rubber housing 44, and thereby the tire pressure monitoring assembly 40 is pulled through the opening until the flange 46 abuts an inner surface of the wheel rim 10. Once the flange 46 abuts the inner surface, the force 58 can be released. Upon release of the force 58, the rubber housing 44 is snapped radially back to expand out over the outer surface of the wheel rim 10 that surrounds the opening 14. The snapping back and retention of the original radially expansive state is provided by the coil spring 48 member. Once the force in the direction of arrow 58 is released, nothing is countering the biasing force exerted by the coil spring 48, and therefore the coil spring 48 returns to the original shape and drives the rubber housing radially outward with it. The resulting securement is provided not only by the resiliency of the rubber housing 44 but also by the added biasing force exerted by the coil spring 48, and specifically the large diameter portion 52.

Figure 6:
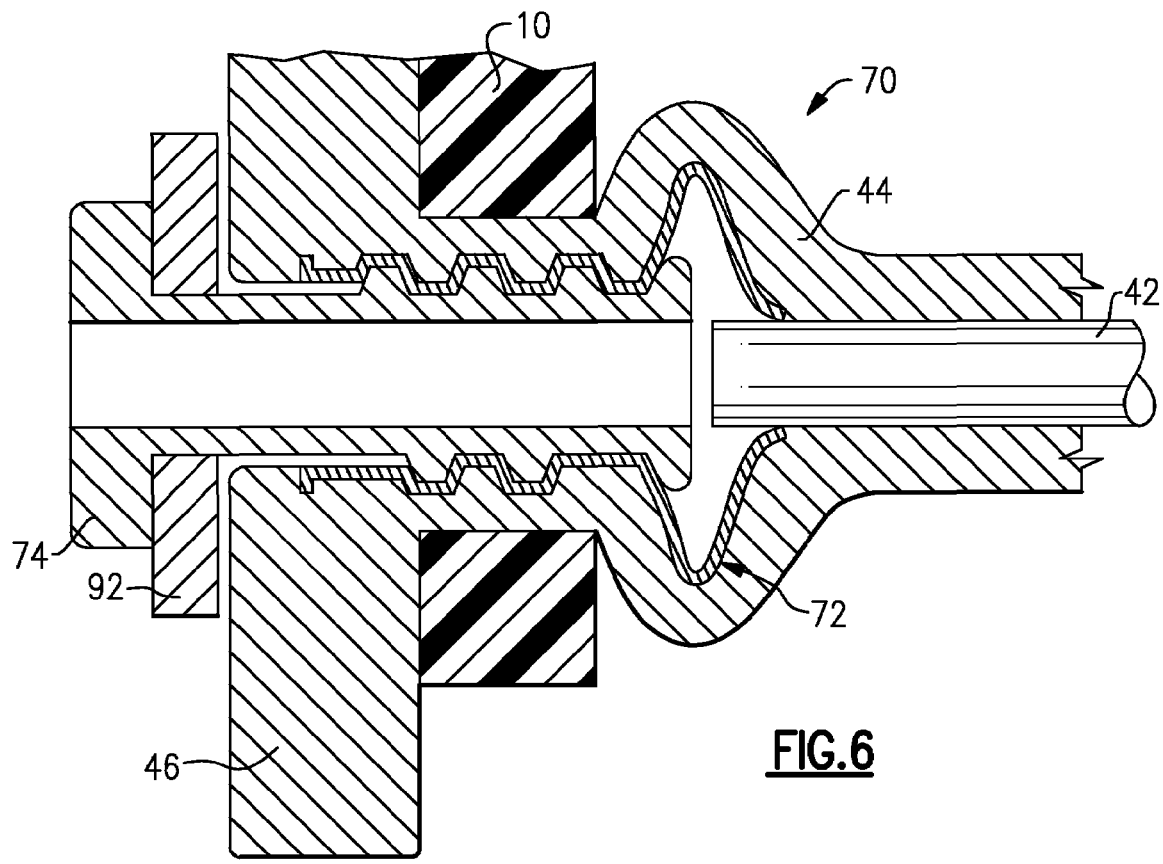
FIG. 6 is a cross-sectional view of the vale stem of FIG. 5 mounted to the wheel rim.
Figure 5:
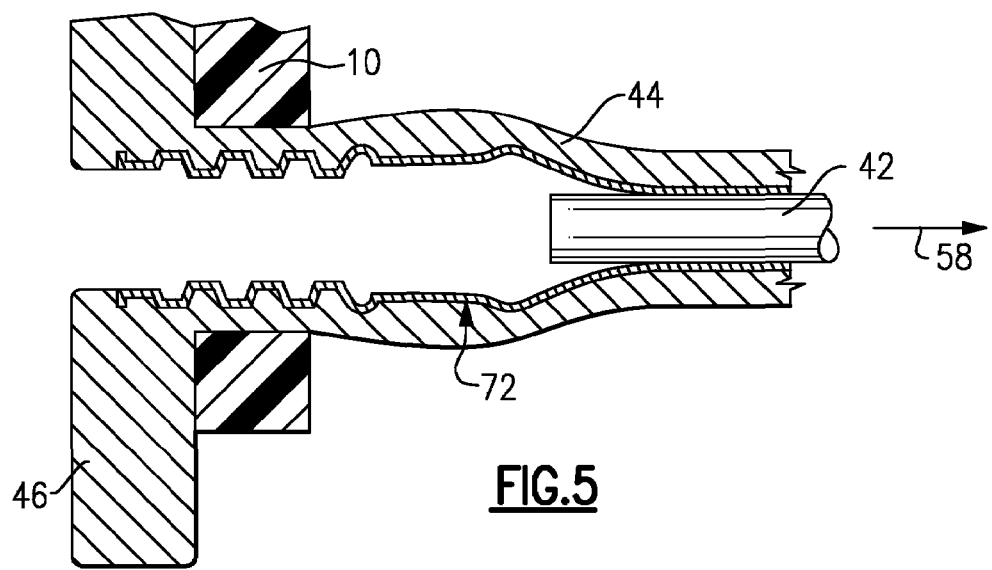
FIG. 5 is a cross-sectional view of another valve stem assembly during assembly to the wheel rim.

Referring to FIGS. 5 and 6 another tire pressure monitoring assembly 70 retains the tire pressure sensor housing 92 in the rubber housing 44 with a spring insert 72. The example spring insert 72 includes corrugations 76 that engaged the mounting insert 74 to hold the housing 92 in place. The example spring insert 72 comprises a strip of biasing material that includes shape memory so that it will snap back to an original shape upon the release of an external force.

The pulling force 58 cause the rubber housing 44 and the spring insert 72 to elongate and neck down in diameter to provide for insertion through the opening 14. The valve stem 42 is held within the rubber housing 44 and therefore moves axially in the direction of arrow 58. The spring insert 72 can be fabricated from spring steel or any other resilient material that will snap back toward a desired shape. In this example, the spring insert 72 is overmolded, or encapsulated within the rubber housing 44. However, the spring insert 72 may be simply inserted within the bore of the rubber housing 44.

Once the axial pulling force indicated at 58 is released, the spring insert 72 snaps back and extends radially outward. The rubber housing 44 is thereby driven radially outward to extend outwardly from the opening 14. Further, the radial bias of the spring insert 72 exerts a force on the interior surface of the opening 14 that maintains the tire pressure monitoring assembly 70 in a desired position. The release of the axial force 58 also results in the valve stem 42 returning to a closer in axial position as is shown in FIG. 6.

Figure 7:
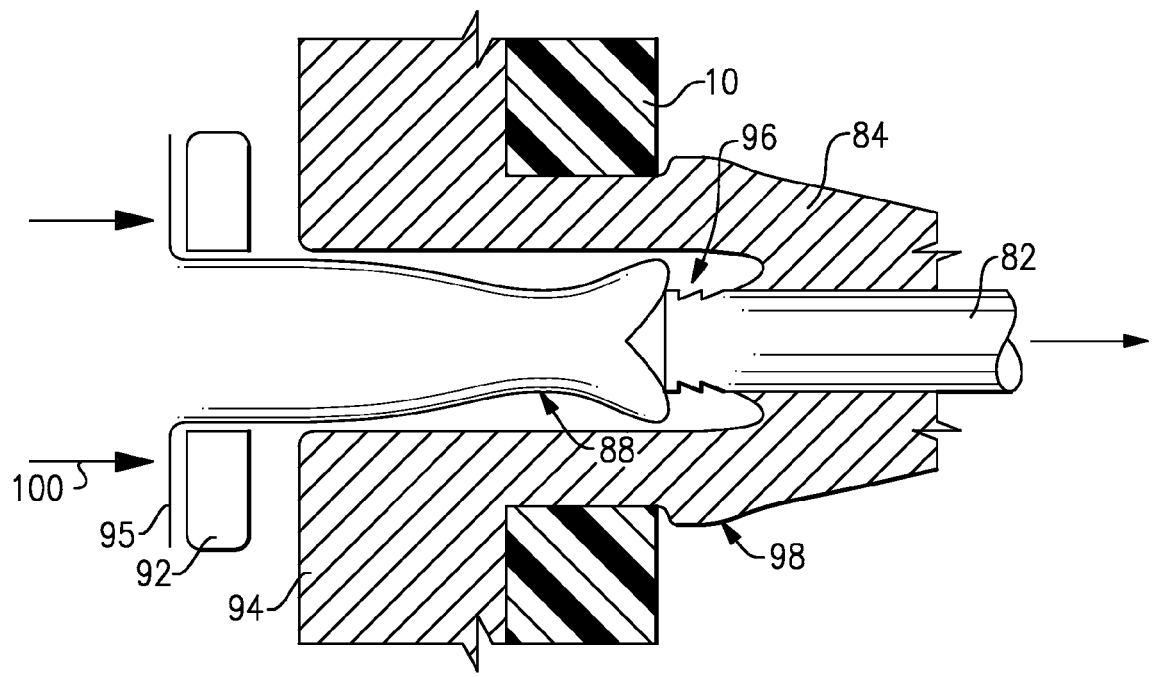
FIG. 7 is a cross-sectional view of yet another example valve stem during assembly to the wheel rim.
Figure 8:
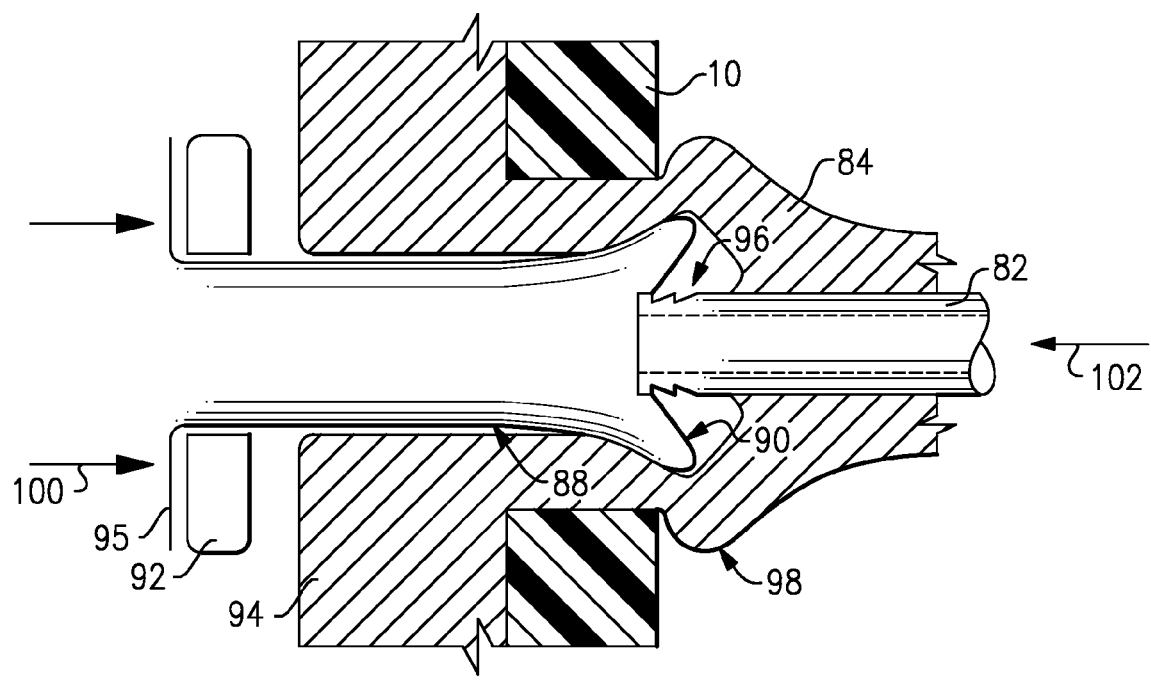
FIG. 8 is a cross-sectional view of the vale stem of FIG. 7 mounted to the wheel rim.

Referring to FIGS. 7 and 8, another spring insert 88 is inserted within the bore of a rubber housing 84 and expanded radially upon engagement with a valve body 82. The rubber housing 84 is first inserted within the opening 14 of the wheel rim 10. Insertion of the rubber housing 84 can be by pulling or pushing as is known. Once the rubber housing 84 is in place the spring insert 88 is pushed into the rubber housing 84 from an interior portion of the wheel rim in a direction indicated by arrows 100. The spring insert 88 includes a flange portion 95 that engages and secures the tire pressure monitoring sensor housing 92 to the rubber housing and valve stem 82.

The rubber housing 84 includes a portion 98 that is initially about the same size or just larger than the opening 14 to provide for insertion and mounting of the rubber housing to the wheel rim 14. The spring insert 88 is then pushed into the bore of the rubber housing toward the outside of the wheel rim 10. The valve stem 82 is pushed inwardly toward the wheel rim 10 through the rubber housing 84 toward the spring insert 88. The valve stem 82 includes detent teeth 96. The spring insert 88 includes a leading edge surface configuration that engages the valve stem 82. Further engagement of the valve stem 82 with the spring insert 88 cause cam lobes 90 of the spring insert 88 to be driven radially outward.

The radial outward movement of the cam lobes 90 of the spring insert 88 causes a corresponding radial expansion of the rubber housing 84 at the point 98. The radial outward expansion of the spring insert 88 and the rubber housing 84 generates a bias in a direction radially outward against the interior walls of the opening 14. This mechanical bias generated by the spring insert 88 engagement with the valve stem 82 strengthens the position of the tire pressure monitoring valve within the opening 14.

The detent teeth 96 of the valve stem 82 further engage the cam lobes 90 once inserted to secure and lock the valve stem 82 in place. Further, the detent teeth 96 lock the spring insert in the radially expanded position.

Figure 9:
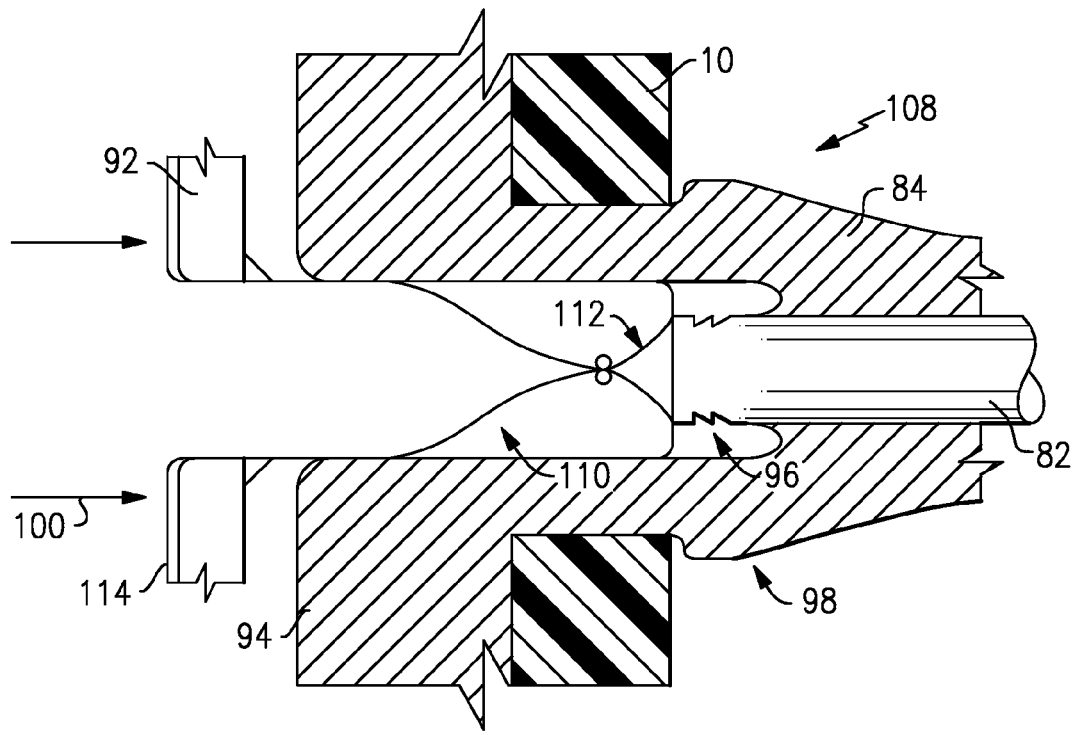
FIG. 9 is a cross-sectional view of a tire pressure monitoring assembly being mounted to the wheel rim.
Figure 10:
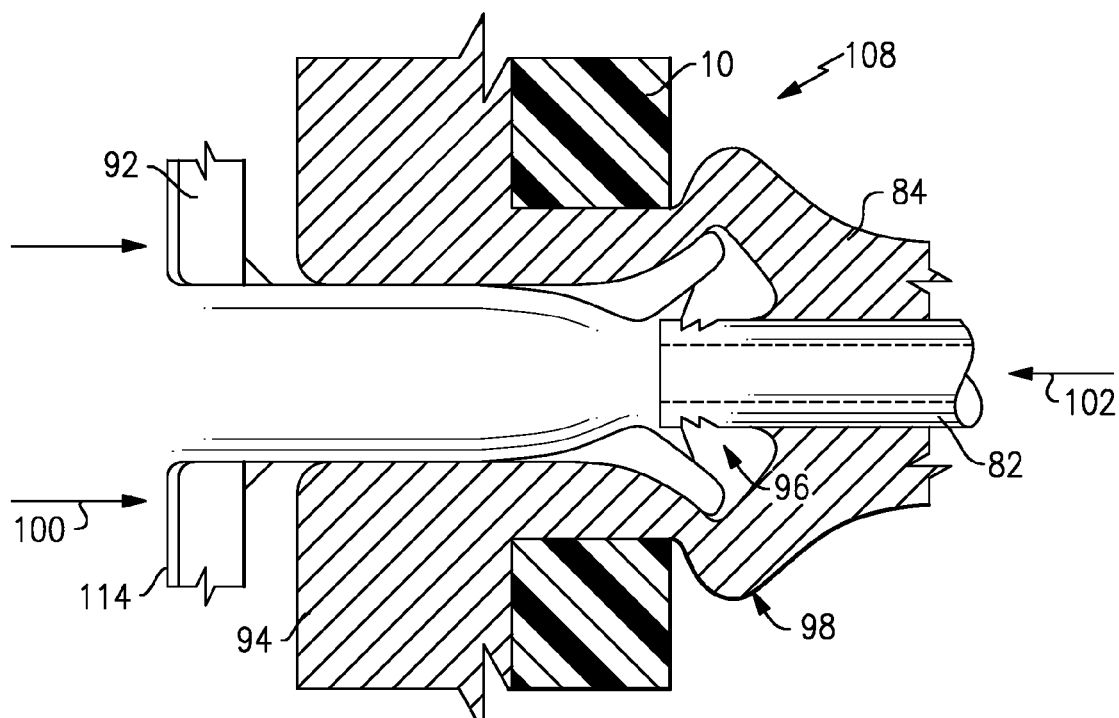
FIG. 10 is a cross-sectional view of the tire pressure monitoring assembly mounted to the wheel rim.

Referring to FIGS. 9 and 10, another example spring insert 110 includes cam surfaces 112 between which the valve stem 82 is inserted to drive the cam surfaces 112 radially outward. The valve stem 82 includes the detent teeth 96 that engage the cam surfaces 112 to secure the valve stem 82 in place and the radial position of the spring insert 110. The spring insert 110 includes flange portion 114 that secures the housing 92 to the rubber housing 84, and thereby the wheel rim 10. The spring insert 110 is received within a bore of the rubber housing 84 and into locking engagement with the valve stem 82.

During assembly a force in the direction 100 is exerted to push the spring insert 110 into the rubber housing bore, and an opposite force 102 pushes the valve stem 82 into engagement with the spring insert 110. The resulting engagement between the spring insert 110 and the valve stem 82 drives the rubber housing radially outward to bulge over and overlap a portion 98 onto the outer surface of the wheel rim 10. This outward radial bias is maintained by the locking engagement of the cam surfaces 112 with the detent teeth 96.

Figure 11:
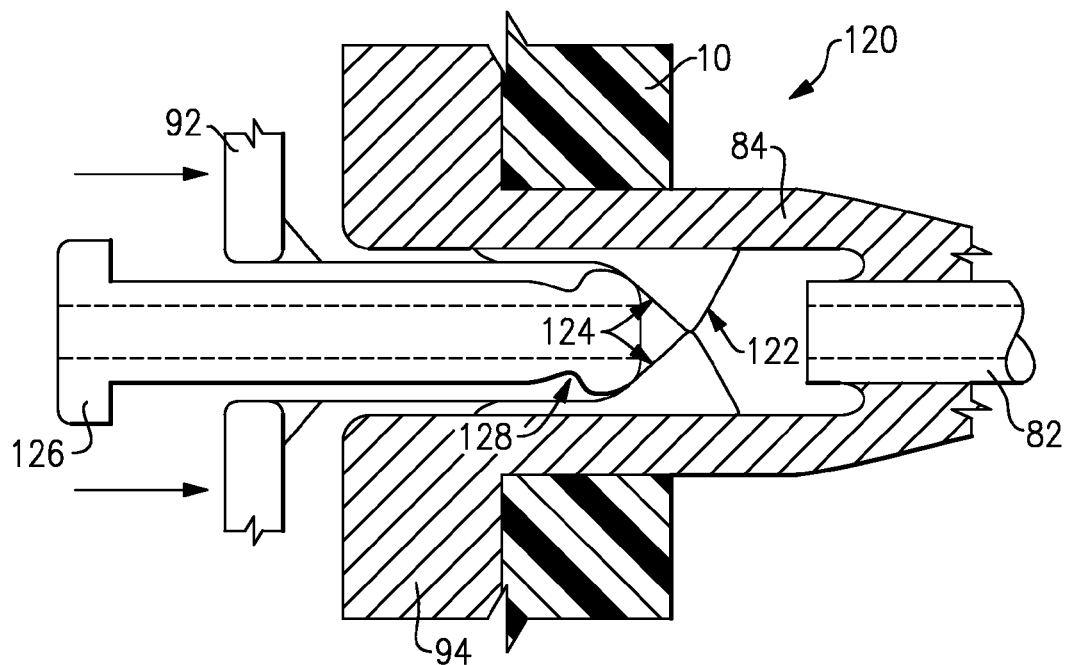
FIG. 11 is a cross-sectional view of another tire pressure monitoring assembly during an intermediate assembly step.
Figure 12:
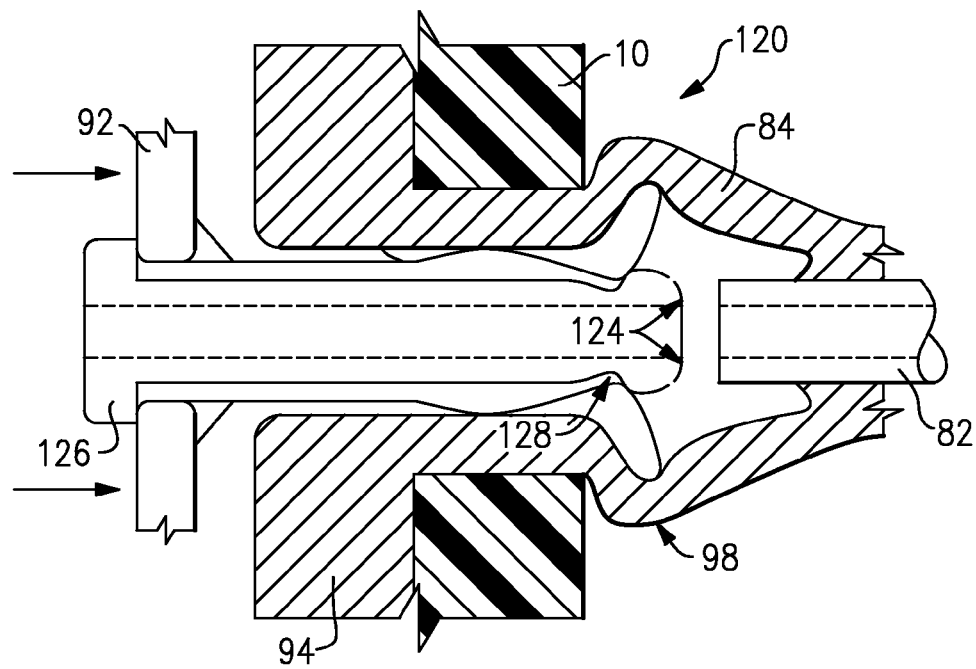
FIG. 12 is cross-sectional view of the tire pressure monitoring assembly mounted to the wheel rim.

Referring to FIGS. 11 and 12, another tire pressure monitoring assembly 120 includes the rubber housing 84 that inserted through the opening 14 in the wheel rim 10. A valve stem 82 is supported and held within the rubber housing 84. A spring clip 122 is inserted within the bore of the rubber housing 84 through an interior facing opening. A mandrel 126 is also inserted through the interior facing opening. The spring clip 122 includes cams 124 that are engaged by a head of the mandrel 126. The valve stem 82 does not engage the spring clip 122.

The rubber housing 84 is first pushed or pulled into the opening 14 from an interior side of the wheel rim 10 until the flange 94 abuts the interior surface of the wheel rim 10. The mandrel 126 is then inserted through an opening in the housing 94 and the spring clip 122. The mandrel 126 and the spring clip 122 both are inserted into the bore of the rubber housing 84. The mandrel 126 and the spring clip 122 can also be preassembled and installed at once into the wheel rim 10. The mandrel 126 is longer than the spring clip 122; therefore a spring clip flange engages the housing 94 prior to a flange of the mandrel 126. The mandrel 126 is received further within the rubber housing bore and engages the cams 124. The head of the mandrel drives the cams 124 radially outward to expand the portion 98 of the rubber housing against the interior surfaces of the opening 14. Further, the portion 98 overlaps the outer surface of the wheel rim 10 surrounding the opening 14 to secure the rubber housing 84 and the tire pressure monitoring sensor housing 92.

The mandrel includes a detent 128 that locks into the cams 124 to maintain the radial outward expansion and to lock the mandrel 126 in place. Further, the radial expansion of the cams 124 locks the tire pressure monitoring housing 92 to the wheel rim 14 by preventing the mandrel from 124 from being pulled back through the opening 12. As appreciated, once the mandrel 126 is engaged and locked into the cam 124, it cannot be removed.

Accordingly, the example tire pressure monitoring assemblies provide increased support for the valve stems to substantially prevent undesired movement during operation.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A tire pressure monitoring assembly mountable to a wheel rim comprising:
   a rubber housing defining a bore;
   a valve body disposed at least partially within the bore; and
   a spring member disposed within the bore of the rubber housing and biased against a surface of the wheel rim for securing the tire pressure monitoring assembly, wherein the spring member includes a shape that biases a portion of the rubber housing radially outward.

2. The assembly as recited in claim 1, wherein the spring member compresses radially responsive to the assembly being pulled through an opening in the wheel rim.

3. The assembly as recited in claim 1, wherein the spring member comprise a strip of material that deforms from a first shape that biases a portion of the rubber housing radially outward to a second shape that retracts the portion of the rubber housing for insertion through the opening an opening in the wheel rim.

4. The assembly as recited in claim 1, wherein the spring member includes a portion for securing a sensor housing within the wheel rim.

5. The assembly as recited in claim 3, wherein the spring member comprises a coil spring including a first diameter and a second diameter, wherein the second diameter is larger than the first diameter.

6. The assembly as recited in claim 1, wherein the spring member includes a cam surface engageable for biasing the spring member radially outward.

7. The assembly as recited in claim 6, including a mandrel received within the bore for engaging the cam surface and biasing the spring member radially outward.

8. The assembly as recited in claim 7, wherein the mandrel comprises a portion of the valve body that engages the spring member.

9. The assembly as recited in claim 7, wherein the mandrel includes a detent for locking the spring member in a radially outward position.

10. A method of securing a valve stem and tire pressure monitoring assembly to a wheel rim comprising the steps of:
    a) inserting a rubber housing through an opening in a wheel rim; and
    b) expanding a biasing member supported by the rubber housing radially outward to engage a surface of the wheel rim radially outboard of the opening.

11. The method as recited in claim 10, wherein the biasing member comprises a spring clip supported on a valve stem extending from the rubber housing.

12. The method as recited in claim 10, including the step of disposing the biasing member within the rubber housing and compressing the biasing member to a size capable of being received through the opening in the wheel rim.

13. The method as recited in claim 10, wherein the step of compressing the biasing member comprises pulling the rubber housing axially to elongate a portion of the biasing member and concurrently reduce a size of the biasing member.

14. The method as recited in claim 10, including the step of disposing a biasing member within a bore of the rubber housing and deforming the biasing member radially outward with a fixed part of the tire pressure monitoring assembly received within the bore.

15. The method as recited in claim 14, including the step of locking the biasing member in the deformed radially outward position with a detent on the fixed part.

* * * * *